| United States Patent [19] | [11] Patent Number: 4,755,371 |
| Dickerson | [45] Date of Patent: Jul. 5, 1988 |

[54] METHOD FOR PRODUCING CARBON BLACK

[75] Inventor: Theodore Dickerson, Bixby, Okla.

[73] Assignee: Columbian Chemicals Company, Atlanta, Ga.

[21] Appl. No.: 521,484

[22] Filed: Aug. 8, 1983

[51] Int. Cl.$^4$ .................... C01B 31/62; C09C 1/48
[52] U.S. Cl. .................... 423/450; 423/449; 423/455; 423/460
[58] Field of Search .............. 423/445, 449, 450, 455, 423/456, 457, 460

[56] References Cited

U.S. PATENT DOCUMENTS

| 2,779,664 | 1/1957 | Sweitzer | 423/460 |
| 3,253,890 | 5/1966 | De Land et al. | 423/455 |
| 3,523,812 | 8/1970 | Kraus | 423/460 |

*Primary Examiner*—Gregory A. Heller
*Attorney, Agent, or Firm*—Head & Johnson

[57] ABSTRACT

A process for producing a relatively coarse, highly structured carbon black having a large surface area. The method comprises mixing a hydrocarbon feedstock with hot combustion gases at a high temperature in a reaction chamber wherein turbulence and stream velocity are relatively low in order to produce a preliminary coarse carbon black and effluent gases. The produced coarse carbon black is subsequently separated from the effluent gases. The separated produced carbon black is thereafter fed into a reaction chamber wherein turbulence and residence time are specifically controlled. Subsequently, the separated and produced carbon black is oxidized under controlled conditions within the reaction chamber with hot combustion gases in order to produce a coarse, large surface area, highly structured carbon black product and effluent gases. The effluent gases are thereafter separated from the coarse, high surface area, highly structured carbon black product.

4 Claims, No Drawings

METHOD FOR PRODUCING CARBON BLACK

BACKGROUND OF THE INVENTION

1. Field of the Invention

This invention is related to a process for producing carbon black. More specifically, this invention provides a process for producing a relatively coarse, highly structured carbon black having a large relatively uncontaminated surface area.

2. Description of the Prior Art

In conventional processes of making carbon black, it has been difficult to achieve and control a relatively high ratio of aggregate particle size to surface areas; that is, in manufacturing a carbon black particle with a large surface area, the particle size became smaller. Prior art methods that increase surface area by hollowing out the aggregate carbon black particle, without decreasing significantly the aggregate particle size, resulted in excessive etching of the surface of the aggregate particle.

Also, in conventional processes of making carbon black, it has been difficult to achieve consistently a relatively uncontaminated surface because of an inability to clean the surface of the carbon black particle due to the presence of contaminants in the effluent gases. Even when special care is taken in the processes of the prior art to make a relatively clean surface, it was found to be economically unattractive because of low yields.

U.S. Re. Pat. No. 19,664 by Damon teaches modifying the properties of commercial carbon black by subjecting it to a controlled oxidation in such a manner as to increase its oxygen content. Damon discovered that more efficient and accurate results may be achieved by subjecting carbon black, which has been produced under conditions resulting in maximum yield, to a supplementary and separate oxidizing treatment under controlled conditions. In carrying out his invention, Damon secured satisfactory results by subjecting commercial carbon black to heat within definite limits and agitation in the presence of atmospheric oxygen. U.S. Pat. No. 3,184,290 by Jordan relates to a novel, highly conductive carbon black produced from those hydrocarbonaceous tars or residues which have high contents of materials known generally in the art as asphaltenes or carbenes. Jordan teaches the pyrolysis of asphaltenes which have been treated with chemical oxidizing agents, particularly nitric acid and nitric oxides. U.S. Pat. No. 3,607,064 by Dollinger et al. illustrates a method of adding property-controlling additives to the reaction zone in carbon black production. More specifically, Dollinger et al. discloses introducing with the pre-heated make-oil a property-effecting mixture having a melting point less than that temperature to which the make-oil is preheated. U.S. Pat. No. 3,725,103 by Jordan et al. relates to a new type of carbon black products prepared by a furnace process which, while not aftertreated, have physical properties which render the blacks different from any other conventionally known types of grades of carbon blacks. U.S. Pat. No. 3,787,562 by Heller et al. discloses a carbon black product which is employed as pigments in rubber, paints, lacquers, and plastics. U.S. Pat. No. 3,867,513 by Krejci teaches a method and apparatus for introducing charge oil and a dispersant as a mixture into a carbon black reactor to establish two zones of charge oil at different entrance velocities into the reactor. U.S. Pat. No. 3,952,087 by Antonsen et al. relates to a process for preparing carbon blacks by the incomplete combustion of hydro-carbonaceous feedstocks wherein the resultant blacks have higher structure characteristics than the carbon blacks normally prepared from the feedstocks. U.S. Pat. No. 3,992,218 by Suetsugu et al. discloses an industrially advantageous preparation of a coloring agent having excellent characteristics by using furnace carbon black as the coloring component. U.S. Pat. No. 4,013,759 by Giet teaches a process which comprises the incomplete combustion of at least one hydrocarbon having at least one ethylenical bond, preheated to a temperature clearly higher than its critical temperature. The recovered carbon black may be used in the manufacture of dry cells. U.S. Pat. No. 4,018,878 by Reynolds discloses an oil furnace process for the production of tread grade rubber reinforcing carbon black which is modified in respect of the manner in which a carbon black producing feedstock oil is introduced into the cracking zone so as to facilitate the formation of carbon black of requisite structure characteristics having improved particle size distribution. U.S. Pat. No. 4,031,189 by Gemmeke et al. teaches a process for preparing a composition high in carbon content and containing only a small amount of ash, nitrogen and sulfur by the conversion of a hydrous carbon sludge or carbon pellets. U.S. Pat. No. 4,061,719 by Shallus et al. discloses a process of conductive carbon black for use in depolarization masses in dry batteries. U.S. Pat. No. 4,075,156 by Johnson teaches a production of non-carcinogenic large particle carbon black. U.S. Pat. No. 4,093,421 by Jerkins illustrates an injection assembly for introducing a plurality of laterally spaced sprays of a normally liquid hydrocarbon feedstock into the cracking zone of a carbon black furnace. U.S. Pat. No. 4,101,639 by Surovikin et al. relates to methods of producing carbon black and may be used for the production of various types of carbon blacks as well as for the production of technical grades of hydrogen obtained as a gaseous by-product. Finally, U.S. Pat. No. 4,279,880 by Giet teaches an acetylene black having both high electrical conductivity and high absortive capacity for liquids. None of the foregoing prior art teach or suggest the novel furnace process of this invention for producing a relatively coarse, highly structured carbon black having a large surface area.

SUMMARY OF THE INVENTION

It is therefore an object of this invention to provide a novel process for producing a relatively coarse, highly structured carbon black having a large surface area.

It is another object of this invention to provide a novel process for producing carbon black which allows a more definitive control of the ratio of the particle size to surface area.

Still another object of this invention is to provide a process for producing carbon black which keeps non carbon contaminates at a minimal while increasing the surface area without increasing the fineness of the carbon black particles.

These and other objects of the invention will become apparent from the following description and the appended claims.

In carrying out the present method for producing a relatively coarse, highly structured carbon black having a large surface area, the first step is to mix a hydrocarbon feedstock with hot combustion gases at a high temperature in a reaction chamber wherein turbulence and stream velocity are relatively low in order to produce a preliminary coarse carbon black and effluent gases. The produced coarse carbon black is separated from the effluent gases. Subsequently, the separated produced carbon black is fed into a reaction chamber wherein turbulence and residence time are specifically controlled. The carbon black is oxidized under these controlled conditions within the reaction chamber in order to produce the coarse, large surface area, highly structured carbon black product and effluent gases. Finally, the coarse, large surface area, highly structured carbon black product is separated from the effluent gases.

DETAILED DESCRIPTION OF THE INVENTION

In accordance with the present invention, a relatively coarse, highly structured preliminary carbon black product with a large surface area is initially prepared. A relatively coarse carbon black is a carbon black having an EMSA of between about 80 and 150 m²/gm, and a large surface area carbon black has a iodine adsorption measurement of between about 350 and about 1500 m²/gm. A highly structured carbon black is one which has a dibutylphythalate (DBP) adsorption of between about 240 and about 350.

In the preparation of such a carbon black, feedstock yield is important. Accordingly, to produce such a preliminary carbon black product, a hydrocarbon feedstock is decomposed into carbon black in a reaction chamber wherein turbulence and downstream velocities are relatively low (long reaction time) to facilitate the production of the preliminary relatively coarse and highly structured carbon black particle with a large surface area. In addition to turbulence and downstream velocities, preparation of this preliminary carbon black is also controlled by the adjustment of the hydrocarbon feed spray type and position, hydrocarbon feed rate and the particular hydrocarbon feedstock, all well known to those in the art.

In preparation of this preliminary carbon black, it is desired that the carbon black produced be as coarse and as high in structure and surface area as practical without substantially reducing the yield and quality of the end preliminary carbon black product. The parameters for producing such desired preliminary carbon black product will vary in accordance with the design of the carbon black reactor as well known to those in the art. While the design of carbon black reactor may be of any type that provides for low turbulence and stream velocities, it is preferred that the carbon black reactor be designed with a large diameter such as that described in U.S. Pat. No. 3,253,890 by DeLand et al, which is incorporated by reference herein, and wherein carbon black particle size, reaction time and operating conditions can be controlled to the extent necessary. It is also desirable that this preliminary carbon black product have a surface that is free of non-carbonaceous material. This can be accomplished by purging all flue gases from the product at a temperature above 450° F. in order to minimize condensation of sulfur and other vapors on the product.

This preliminary carbon black product is generally not completely suitable as a medium having high thermal and/or electrical conductivity at low carbon black loadings, or where there is a requirement for a surface having minimum non-carbonaceous material as an ingredient in high strength and fluid plastics suitable for flood handling.

The carbon black product commonly used and which has been generally found to be suitable for these applications is a by-product of a synthesis gas process. This carbon black product is initially recovered from an aqueous slurry wherein the black is found in low concentrations. It must thereafter be treated to meet quality requirements. This type of recovery and treatment causes this carbon black end product to be relatively expensive. Moreover, since this carbon black is a by-product, it is not expedient to alter the synthesis gas process to vary the properties of the carbon black by-product. Therefore, it is difficult to modify this carbon black to optimize its performance in these applications and maintain a consistent quality product.

I have discovered a process for economically producing a relatively coarse, highly structured carbon black having a large and relatively uncontaminated surface area which has a high cleanliness standard and can be used as a medium having high thermal and/or electrical conductivity at low carbon black loadings. Also, the properties of the carbon black product produced by my novel process can be easily modified to optimize the performance characteristics of the black in various applications at substantially more favorable economics than existing processes.

My novel process for producing such carbon black product comprises feeding with a nitrogen or air carrier the preliminary carbon black produced by a conventional furnace process into a furnace reactor such as described in U.S. Pat. No. 3,253,890 by DeLand et al, under controlled oxidation conditions with hot combustion gases in order to increase the surface area of the end carbon black product by hollowing out the particles while simultaneously burning contaminants from the carbon black's surface.

The furnace reactor can be designed by one skilled in the art to effect low stream velocities and turbulence, long reaction time, high temperature and a controlled atmosphere within the reaction chamber of the furnace reactor. The preliminary produced carbon black is pumped with a nitrogen stream, or air carrier, into the reactor chamber through a conduit. Some carbon blacks are naturally fluid while others have to be fluidized with a nitrogen, steam, or air inert carrier, also free of contaminants.

I have discovered that the success of my invention depends on monitoring the oxidation conditions in the atmosphere of the reaction chamber through the control of the available oxygen originating from air, steam, or oxygen, and the high temperature contact time. The conditions are controlled such as to increase the surface area of the end carbon black product without substantially reducing the particle size. Furthermore, the oxidation conditions are controlled in an atmosphere free of flue gas contaminants of the preliminary carbon black product such that subsequent separation of the desired end carbon black product from its effluent gases yields a black having a relatively uncontaminated and inert surface area. In a preferred embodiment of any invention, the oxidation conditions are controlled by maintaining the furnace under the following approximate conditions:

| | |
|---|---|
| Air, MCFH | 100–150 |
| Oxygen, MCFH | 0–4 |
| Process Gas, MCFH | 6–14 |
| Blast Ratio | 7.1–25.7 |
| Total Ratio | 8.1–26.7 |

| -continued | |
|---|---|
| Feedstock, lb/hr | 500–800 |
| Residence Time of the Carbon Black | 1.5 secs.–4.5 secs. |

In a more preferred embodiment of my invention, the oxidation conditions are as follows:

| Air, MCFH | 120–130 |
|---|---|
| Oxygen, MCFH | 0–1 |
| Process Gas, MCFH | 8–12 |
| Blast Ratio | 10–16.2 |
| Total Ratio | 10–16.2 |
| Feedstock, lb/hr | 600–700 |
| Residence Time of the Carbon Black | 3.0 secs.–4.0 secs. |

The introduction or feeding of a coarse, high-instructure and -surface area preliminary carbon black product into a carbon black furnace under any of the foregoing conditions increases the surface area of the end carbon black product and simultaneously maintains the carbon black particle size essentially constant and burns any contaminants that may be on the surface of the preliminary carbon black product. Thus, the particle fineness or size/surface area ratio is controlled significantly better than conventional processes while simultaneously providing improved surface purity. Also, perhaps most importantly, the economics are dramatically improved over conventional processes.

The present invention can be better understood from the following example which is intended to illustrate rather than limit the scope of the invention.

EXAMPLE

For the purposes of the present example, the carbon black reactor of U.S. Pat. No. 3,253,890 by DeLand et al is used. Fuel and air were burned in the blast section to produce a hot blast which mixed with a suitable hydrocarbon feed that was fed through the feed conduit.

The furnace conditions were as follows:

| Air, MCFH | 200.0 | |
|---|---|---|
| Oxygen, MCFH | 7.7 | (2.9% Enrichment) |
| Process Gas, MCFH | 16.9 | |
| Blast Ratio | 11.8 | |
| Total Ratio | 14.0 | |
| Feedstock Oil, GPH | 316.0 | |
| Residence Time of the Carbon Black | 1.6 secs. | |

The operating data were as follows:

| Production Rate-lbs/day | 31,098 |
|---|---|
| Oil Yield-lbs/gallon | 4.10 |
| Equivalent Oil Yield/lbs/Equivalent | 2.81 |

The preliminary carbon black product had an $I_2$ surface area of 400 $m^2$/gm, an EMSA of 120 $m^2$/gm, a dibutylphthalate adsorption of 250+ cc/100 g and a transmission of 95%. The preliminary carbon black product was purged of its effluent gases at 450° F.

The carbon black product was pumped with a nitrogen carrier back into the carbon black reactor, or a similar one, at a position 1 inch downstream of the choke at the following furnace conditions:

| Air, MCFH | 125.0 |
|---|---|
| Oxygen, MCFH | None |
| Process Gas, MCFH | 10.4 |
| Blast Ratio | 12.0 |
| Total Ratio | 12.0 |
| Feedstock, lb/hr | 650.0 |
| Residence Time of the Carbon Black | 3.0 secs. |

The operating data were as follows:

| Production Ratio-lbs/day | 14,400 |
|---|---|
| Oil Yield-lbs/gallon | 2.81 |
| Equivalent Oil Yield/lbs/ Equivalent Gal. | 1.10 |
| Raw Material cost/lb | $0.66 |
| Cost w/extra labor | $0.71 |

The end product was quenched and purged of its effluent gases at the bag collectors at 450° F. The product was conveyed with nitrogen, dry beaded and packed. The properties of the end product were as follows:

| | Method of Invention |
|---|---|
| Iodine surface area | 1000 + $m^2$/gm |
| Dibutylpthalate adsorption | 250 + cc/100 gm |
| Moisture | 1.0 |
| % Volatile | 0.5 |
| % Ash | 0.4 |
| % Sulfur | 0.5 |
| % 325 Mesh Residence | .001 |
| Iron, ppm | 150+ |
| Na, Ca, Fe, Mg, total ppm | 1000 |
| Aggregate particle size (EMSA) | 120 $m^2$/gm |

A similar end carbon black product was produced by a conventional synthesis gas method known within the art.

The furnace conditions were as follows:

| Air, MCFH | 200 | |
|---|---|---|
| Oxygen, MCFH | 7.0 | (2.7% Enrichment) |
| Process Gas, MCPH | 15.8 | |
| Blast Ratio | 12.6 | |
| Total Ratio | 14.8 | |
| Feedstock Oil, GPH | 145 | |
| Residence Time of the Carbon Black | 1.6 secs. | |

The operating data were as follows:

| Production Rate-lbs/day | 2,685 |
|---|---|
| Oil Yield-lbs/gallon | 0.75 |
| Equivalent Oil Yield/lbs/ Equivalent Gal. | 0.44 |
| Raw Material Cost/lb | $2.23 |
| Cost w/Extra Labor | $2.23 |

The end product was quenched and purged of its effluent gases at the bag collectors at 450° F. with nitrogen. The product was conveyed with nitrogen, dry beaded and packed in plastic bags. The properties of the end product were as follows:

|  | Conventional Method |
| --- | --- |
| Iodine surface area | 1000 + m²/gm |
| Dibutylpthalate adsorption | 250 + cc/100 g |
| Moisture | 2.0+ |
| % Volatile | 1.0+ |
| % Ash | 0.5+ |
| % Sulfur | 1.0+ |
| % 325 Mesh Residence | .001 |
| Iron, ppm | 150+ |
| Na, Ca, Fe, Mg, total ppm | 1200+ |
| Aggregate particle size (EMSA) | 140 m²/gm |

It is apparent that the final carbon black product produced in accordance with the process of this invention is a coarse, high surface area and relatively uncontaminated carbon black which offers substantial economic advantages over a conventional synthesis gas process which produces a carbon black product having similar properties.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A method for producing a relatively coarse, highly structured carbon black having a large surface area which comprises the steps of:
   (a) mixing a hydrocarbon feedstock with hot combustion gases at a high temperature in a reaction chamber wherein turbulence and stream velocity are relatively low in order to produe a preliminary coarse carbon black and effluent gases;
   (b) separating the produced preliminary coarse carbon black of step (a) from the effluent gases;
   (c) feeding the preliminary carbon black of step (a) into a reaction chamber wherein the preliminary carbon black is oxidized by hot combustion gases under controlled conditions of about 100 to 150 MCFH of air, about 0 to 4 MCFH of oxygen, about 6 to 14 MCFH of process gas, about 500 to 800 Lbs/hr of preliminary carbon black feedstock, at a blast ratio of about 7.1 to 25.1 and a total ratio of about 8.1 to 26.7, and wherein the residence time is between 1.5 and 4.5 seconds, to produce final large surface area, course, highly structured carbon black product and effluent gases; and
   (d) separating the final highly structured carbon black product of step (c) from the effluent gases.

2. The method of claim 1 wherein in step (b) the preliminary coarse carbon black is separated from the effluent gases at a temperature above 450° F.

3. The method of claim 1, wherein in step (d) the final carbon black product is separated from the effluent gases at a temperature above 450° F.

4. The method of claim 1, wherein in step (c) said feeding of preliminary carbon black into a reaction chamber is accomplished using a carrier selected from nitrogen and air.

* * * * *